(12) United States Patent
Lam et al.

(10) Patent No.: US 9,049,773 B2
(45) Date of Patent: Jun. 2, 2015

(54) DIGITAL CONTROLLER FOR AN ELECTRONIC BALLAST

(75) Inventors: John Lam, Kingston (CA); Praveen Jain, Kingston (CA)

(73) Assignee: CISTEL TECHNOLOGY INC., Ottawa (CA)

( * ) Notice: Subject to any disclaimer, the term of this patent is extended or adjusted under 35 U.S.C. 154(b) by 210 days.

(21) Appl. No.: 13/459,562

(22) Filed: Apr. 30, 2012

(65) Prior Publication Data

US 2012/0306400 A1 Dec. 6, 2012

Related U.S. Application Data

(60) Provisional application No. 61/480,278, filed on Apr. 28, 2011.

(30) Foreign Application Priority Data

Apr. 28, 2011 (CA) ...................................... 2738283

(51) Int. Cl.
*H05B 37/02* (2006.01)
*H05B 41/282* (2006.01)
*H05B 41/392* (2006.01)

(52) U.S. Cl.
CPC ........ *H05B 41/2824* (2013.01); *H05B 41/3927* (2013.01); *Y02B 20/186* (2013.01)

(58) Field of Classification Search
CPC ........... H05B 33/0815; H05B 33/0818; H05B 33/0851; H05B 37/02
USPC .................. 315/223–225, 246–247, 272, 291
See application file for complete search history.

(56) References Cited

U.S. PATENT DOCUMENTS

2007/0182347 A1* 8/2007 Shteynberg et al. .......... 315/312
2009/0243582 A1* 10/2009 Irissou et al. ................. 323/320

OTHER PUBLICATIONS

Jingpeng Zhu et al, "Design of a Digital controller for High Frequency HID Lamp Ballast", Proceedings of the 2009 IEEE 6th International Power Electronics and Motion Control Conference, 2009. IPEMC '09, pp. 2516-2520.
Duk Jin Oh et al, "A Digital Controlled Electronic Ballast Using High Frequency Modulation Method for The Metal Halide Lamp", Proceedings in the 2002 Power Electronics Specialists Conference, 2002. pesc 02. pp. 181-186.

(Continued)

*Primary Examiner* — Thienvu Tran
(74) *Attorney, Agent, or Firm* — Brion Raffoul

(57) ABSTRACT

Provided are circuits and methods for a digital controller for an electronic ballast for a fluorescent lamp, comprising a feed-forward loop that provides information about a voltage firing angle, and a pulse width modulator that controls a duty ratio of at least one power switch of the electronic ballast according to the information. The digital controller may include a duty ratio controller implemented in the pulse width modulator. The digital controller may include one or more functions such as dimming, maintaining high power factor throughout the dimming range, low lamp power detection, lamp soft-start, and DC-link capacitor over-voltage detection for end of life protection or lamp failure protection. In one embodiment the ballast is a single stage, single switch ballast.

16 Claims, 23 Drawing Sheets

(56) References Cited

OTHER PUBLICATIONS

F. J. Azcondo et al, "Low-frequency-square wave electronic ballast with resonant ignition using digital mode and power control", IEEE Applied Power Electronics Conference and Exposition, 2006. APEC '06.

Y. Ishizuka et al, "A Design of a Low-Delay DPWM Control Circuit for DC-DC Converter", Proceedings of the IEEE 2007 International Telecommunications Energy Conference, 2007. INTELEC 2007, pp. 342-347.

A. P. Dancy et al, "Ultra Low Power Control Circuits for PWM Converters", Proceedings of the IEEE 1997 Power Electronics Specialists Conference, PESC '97, pp. 21-27.

Jinwen Xiao et al, "Architecture and IC Implementation of a Digital VRM Controller", Proceedings of the IEEE 2001 Power Electronics Specialists Conference, PESC 2001, pp. 38-47.

Yang Qio et al, "Proposed DPWM Scheme with Improved Resolution for Switching Power Converters", Proceedings of the IEEE 2007 Applied Power Electronics Conference, APEC 2007, pp. 1588-1593.

\* cited by examiner $a = 0°$ ($v_s$: 100V/div; $i_s$: 0.3A/div; $i_{out}$: 0.2A/div; time: 5ms/div)

$\alpha = 86°$ ($v_s$: 100V/div, $i_s$: 0.3A/div, $i_{out}$: 0.2A/div; time: 5ms/div)

($v_s$: 100V/div; $i_s$: 0.3A/div; $i_{out}$: 0.2A/div; time: 50ms/div)

($v_{out}$: 200V/div; $i_{out}$: 0.2A/div; time: 500ms/div)

($v_{out}$: 300V/div; $i_{out}$: 0.2A/div; time: 500ns/div)

($v_{out}$: 100V/div; $i_s$: 0.3A/div; $i_{out}$: 0.2A/div; time: 50ms/div)

($v_{out}$: 100V/div, $i_s$: 0.3A/div; $i_{out}$: 0.2A/div; time: 50ms/div)

DIGITAL CONTROLLER FOR AN ELECTRONIC BALLAST

RELATED APPLICATION

This application claims the benefit of the filing date of U.S. Patent Application No. 61/480,278, filed on 28 Apr. 2011, the contents of which are incorporated herein by reference in their entirety.

FIELD

This invention relates to controllers for electronic ballasts used for fluorescent lamps. In one embodiment, the invention provides a digital controller suitable for an electronic ballast with a single power switching device.

BACKGROUND

The demand for fluorescent lighting is increasing primarily because of its greater efficiency relative to other types of lighting, such as incandescent. Fluorescent lamp ballasts made with discrete components may have reduced reliability and be susceptible to problems caused by variations in circuit component tolerances and ambient conditions (e.g., temperature). Furthermore, as fluorescent lamps replace incandescent lamps, there is increased demand for fluorescent lamps to have desirable features of incandescent lamps, such as small size and dimmability. However, such features are difficult to achieve with current ballast and controller technology.

Digital control has been used in several electronic ballast applications. A digital implementation of phase control was suggested in [1]. Digitized versions of variable frequency control have also been suggested in [2] and [3]. Both control methods were applied to a half-bridge resonant inverter where totempole-connected MOSFETS were controlled. However, since half-bridge resonant inverters were used as the ballast power circuit in the above literature, only variable frequency control or phase-shift control could be used to provide basic functions while at the same time, ensure zero voltage switching (ZVS) operation.

SUMMARY

A digital controller for an electronic ballast for a fluorescent lamp is described herein. The digital controller may include one or more functions such as dimming, maintaining high power factor throughout the dimming range, low lamp power detection, lamp soft-start, and DC-link capacitor over-voltage protection (i.e., end of life protection, lamp failure protection).

Also described herein is a digital controller for an electronic ballast for a fluorescent lamp, comprising: a feed-forward loop that provides information about a voltage firing angle; and a pulse width modulator that controls a duty ratio of at least one power switch of the electronic ballast according to the information. The digital controller may include a duty ratio controller implemented in the pulse width modulator.

The digital controller may provide at least one of dimmability of the lamp, soft-start ignition, detection of lamp low power level, and DC-link capacitor over-voltage protection.

Dimming of the lamp may be controlled by varying phase of the firing angle; or by varying duty cycle a control signal.

Also described herein is an electronic ballast for a fluorescent lamp, comprising a digital controller as described above.

Also described herein is a method of digitally controlling an electronic ballast for a fluorescent lamp, comprising: using a feed-forward loop to provide information about a voltage firing angle; and using a pulse width modulator to control a duty ratio of at least one power switch of the electronic ballast according to the information; wherein control of the electronic ballast is provided. The method may comprise implementing a duty ratio controller in the pulse width modulator.

The method may further comprise providing at least one of dimmability of the lamp, soft-start lamp ignition, detection of lamp low power level, and DC-link capacitor over-voltage protection.

Providing soft-start lamp ignition may include slowly increasing the duty ratio of the at least one power switch, so that a small voltage is initially applied across the lamp when lamp power is turned on, and voltage across the lamp increases gradually as the duty ratio increases.

Dimming the lamp may be controlled by varying phase of the firing angle; or by varying duty cycle a control signal.

In the embodiments described herein, the electronic ballast may be a single stage, single switch ballast.

BRIEF DESCRIPTION OF THE DRAWINGS

For a better understanding of the invention, and to see more clearly how it may be carried into effect, embodiments will be described, by way of example, with reference to the accompanying drawings, wherein.

DETAILED DESCRIPTION OF EMBODIMENTS

Figure 1B:
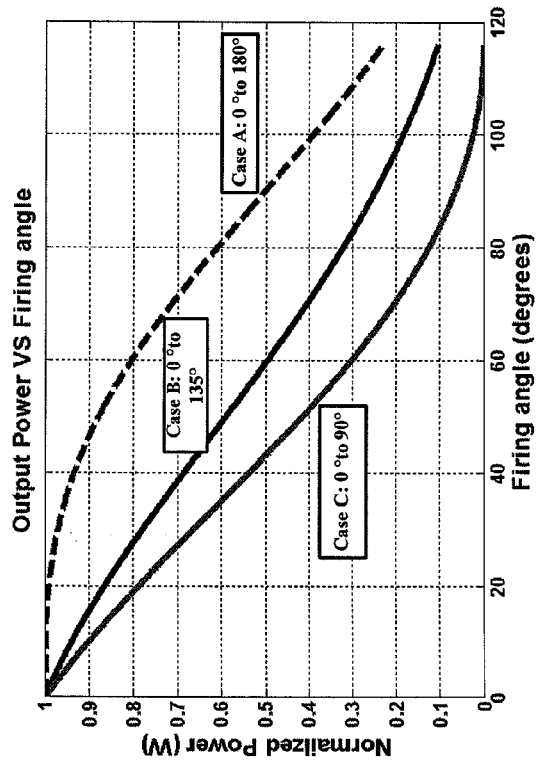
FIG. 1(b) is a plot showing normalized output power as a function of $\alpha$, for different ranges of phase angles.

Described herein is a digital controller for an electronic ballast for a fluorescent lamp. The digital controller overcomes drawbacks of analog controllers such as those associated with variations in circuit component tolerances and ambient conditions (e.g., temperature). Moreover, a digital controller as described herein may be of very small size and is suitable for use with a compact fluorescent lamp (CFL). Digital control as described herein allows implementation of multiple functions in the control logic, such as, for example, dimming, maintaining high power factor throughout the dimming range, low lamp power detection, lamp soft-start, and DC-link capacitor over-voltage protection. This functionality can be embedded on a small digital chip, thereby reducing the size of the control circuit while providing the same or more advanced functionality, and enhanced performance, relative to analog controllers.

A digital controller as described herein may be partially or substantially provided in an algorithm coded in, for example, VHDL: (VHSIC (very high speed integrated circuit) hardware description language), register transfer language (RTL), or Verilog, and thus has greater design flexibility than analog circuits. The algorithm may be partially or completely implemented in a digital technology such as a field programmable gate array (FPGA) or application-specific integrated circuit (ASIC). A digital controller as described herein, or one or more portions thereof, may also be transformed for implementation in a digital signal processor (DSP).

In prior digital controllers used for half-bridge resonant inverters as the ballast power circuit (e.g., [1, 2, 3]), only variable frequency control or phase-shift control could be used to provide basic ballast functions while at the same time, ensure ZVS operations. However, a design challenge with digital control in half-bridge inverters is that proper dead-time control must be considered for the power switch (e.g., MOSFET) gate signals to avoid over lapping the turn-on time of the power switches. Also, such prior digital controllers focused only on non-dimmable electronic ballast applications. If dimming operation is to be included, the overall digital control architecture becomes more complicated.

A digital controller as described herein may be used with an electronic ballast topology having a single switch power stage inverter. For example, in one embodiment the power stage may comprise a single ended primary inductor converter (SEPIC). Such a power circuit is described in our previously-filed patent applications (see, e.g., WO 2009/149556). A digital controller as described herein may also be used with an electronic ballast topology having a two or more power switch inverter. For example, the electronic ballast may be a two switch power circuit using a half bridge inverter. Accordingly, as described herein, digital control based on duty ratio control, e.g., as implemented in a pulse width modulation (PWM) converter, may be applied to greatly simplify control of the power switch. When duty ratio control is implemented digitally, it can be implemented in a much less-complicated fashion than conventional control methods used in half-bridge or full bridge resonant inverters.

Duty ratio control may be used to achieve high power factor (PF) when a phase-cut dimmer is used for dimming the lamp. This means that when duty ratio control is implemented in the digital controller, it does not only eliminate all the design challenges in conventional digital control methods in half-bridge resonant inverters, but also allows high input PF to be achieved during dimming. If power factor correction (PFC) is included in a digital controller for conventional half-bridge resonant inverters, additional control implementations are needed for the front-end PFC converter, which also results in a more complicated digital design architecture than that described herein.

One aspect of controller design for electronic ballasts is the ability to flexibly configure operation of the ballast to enable high power factor during dimming, and to translate the phase cut AC voltage into dimmed light output in a pleasing manner. The use of duty ratio control as demonstrated herein introduces an independent control term (in this case, duty cycle) which may be used in conjunction with the phase angle of the AC signal to vary both the dimmed light output and power factor. This aspect is shown in FIGS. 1(*a*) and 1(*b*).

Figure 1A:
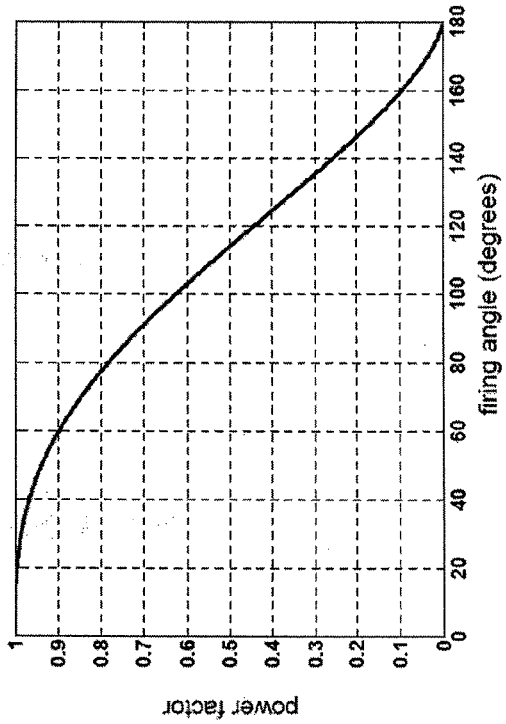
FIG. 1(a) is a plot showing power factor as a function of firing angle ($\alpha$) of a phase cut dimmer.

Three performance curves are shown in FIG. 1(*b*), where the average output power of a CFL ballast and digital controller system is shown as it is dimmed from 0 to 180 degrees. The controller is configured to vary the duty cycle over a reduced phase angle range; case (A) shows the performance when the duty cycle range is equal to the phase angle range 0 to 180 degrees, case (B) shows the performance when the duty cycle range is equal to the phase angle range 0 to 135 degrees, and case (C) shows the performance when the duty cycle range is equal to the phase angle range 0 to 90 degrees.

In each of the three cases, the average output power is reduced to low levels. However, since the phase angle range required to achieve full dimming is reduced, the power factor of the ballast and controller system may be significantly enhanced due to the reduced operating range of the system. For example, the power factor in case (3) is always better than 0.7, whereas the power factor in case (1) can diminish to zero. This is a significant advantage in ballast and controller products for fluorescent lamps such as CFLs, as much higher performance may be achieved.

Digital implementation of the controller provides all the basic functionality of an analog controller and in addition facilitates including other desirable control functions. For example, to enhance the lamp lifetime and its overall performance with standard phase-cut dimmer, the controller may provide soft-start for lamp ignition. The duty ratio in the controller may be increased slowly from a small value until the point where a sufficiently high ignition voltage is provided across the lamp. In soft-start ignition, a small voltage is initially provided across the lamp electrodes to ensure that the lamp life time is not affected during the lamp ignition process.

Another desirable function is detection of lamp low power level. When a phase-cut dimmer is in use, it is possible that unstable lamp operation can occur when the dimmer is used in a very low control position. Unstable lamp behaviour occurs when the lamp is forced to operate outside the negative impedance range of the lamp, i.e., in the positive impedance range. However, in an embodiment described herein, the controller switches the ballast into a low power state where the lamp is essentially off when attempting to dim towards the lower control end of the dimmer. The goal of this function is to avoid the lamp entering an unstable operating range, where visible light flickering occurs. When the dimmer is switched back to a higher control position, the light comes back on.

Another function is DC-link capacitor over-voltage protection, also referred to as end of life protection, or lamp failure protection. In one embodiment this function protects the ballast circuit from a sudden surge in the line voltage. For example, when the DC-link voltage exceeds a certain level, the power switch is turned off immediately to protect the lamp.

Figure 2A:
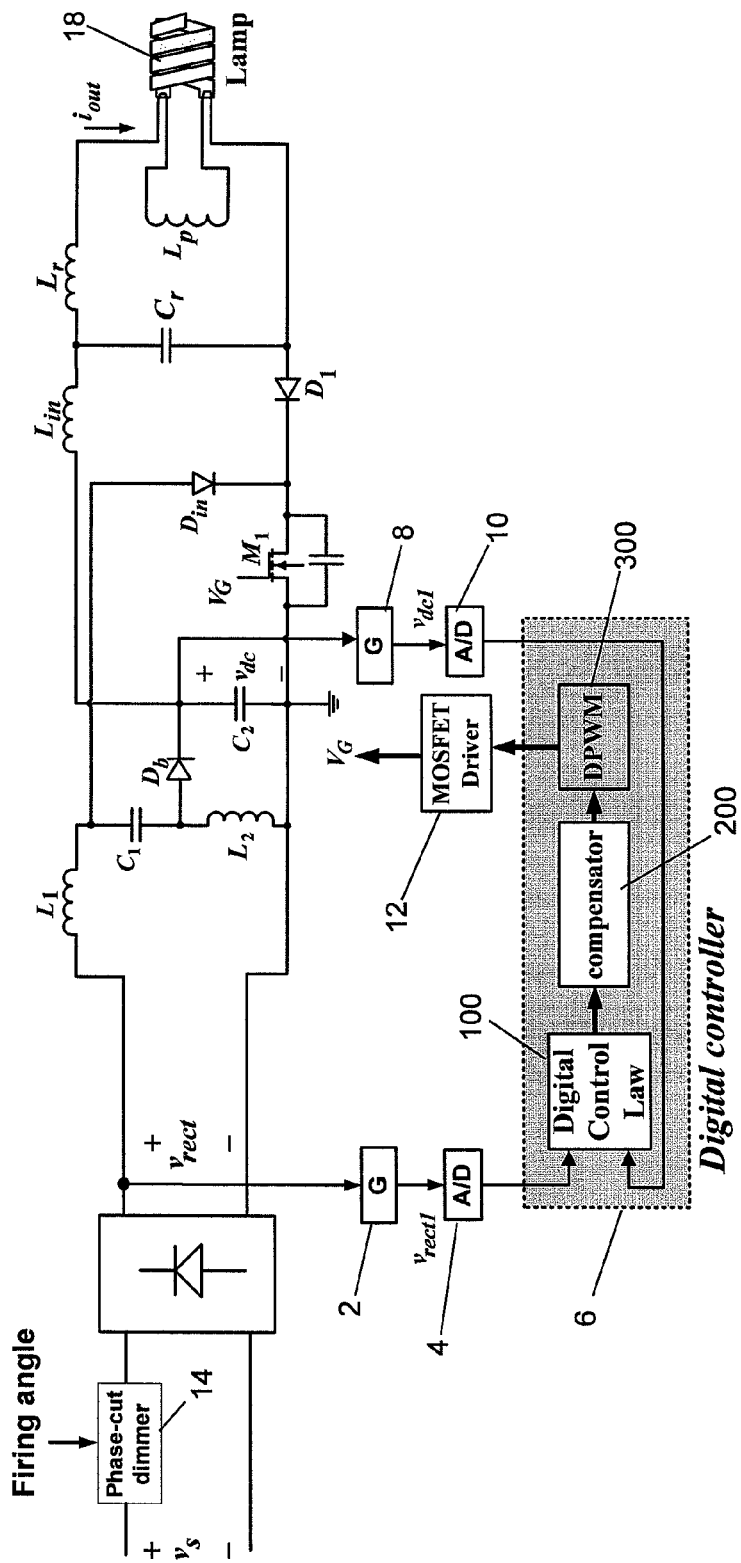
FIG. 2(a) is a generalized diagram of an embodiment of a single power switch electronic ballast with a digital control block.

A generalized digital controller block is shown in the embodiment of FIG. 2(a). This embodiment is based on a single switch power stage inverter, with switch $M_1$, dimmer 14, and lamp 18. It is noted that in the embodiments described herein, the dimmer may be a leading-edge phase cut dimmer or a trailing-edge phase cut dimmer. In general, the digital controller 6 comprises a digital control law (i.e., algorithm) 100, a compensator 200, a digital pulse-width modulation (DWPM) block 300, and a digital feed-forward loop that samples the rectified voltage from the dimmer 14 and includes a gain block 2 and an analog-to-digital converter 4. A feedback loop includes a gain block 8 and analog-to-digital converter 10. The output of the DPWM is fed to a MOSFET driver 12 that generates the power switch drive signal. One or more of the gain blocks 2, 8, and analog-to-digital converters 4, 10 may be implemented digitally or with discrete components.

Figure 2B:
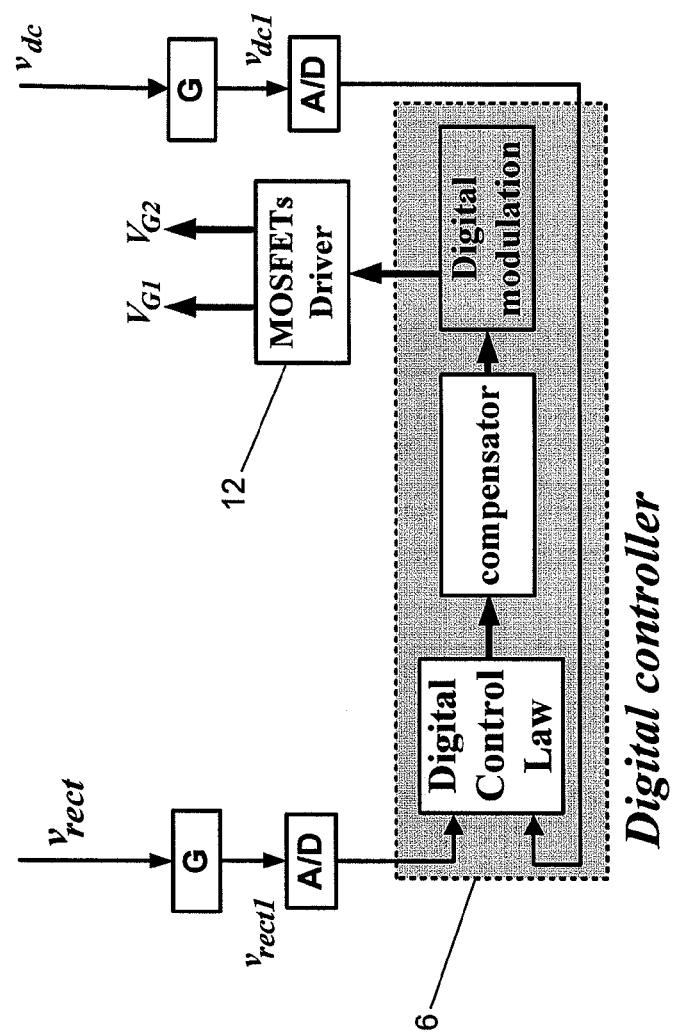
FIG. 2(b) shows an embodiment of a digital controller configured to drive two power switches.

The digital controller may be configured for use with electronic ballasts having two or more switches by providing drive signals with appropriate duty ratios to each switch. FIG. 2(b) shows such an alternative embodiment of the digital controller for driving two power switches of a ballast circuit. The embodiment of FIG. 2(b) may include dead-time control and phase shift functions to drive both switches of a two-switch electronic ballast with appropriate duty cycles. For example, such a digital controller for two switches may allow for variation of the duty ratio substantially from 0 to 50% for each switch.

As described herein, duty ratio control is implemented with the DPWM. This may be accomplished several ways (see, e.g., [4, 5, 6, 7]), including, for example, an approach that employs a counter so that the clock signal is synchronized as a counting signal to provide the switching frequency of the power circuit. Since fast transient response and very high switching frequency are not critical requirements in lighting applications, such a DPWM counter was used in the embodiments described herein. However, the invention is not limited thereto and those of ordinary skill in the art will recognize that other approaches may also be implemented for the duty ratio controller.

Figure 3:
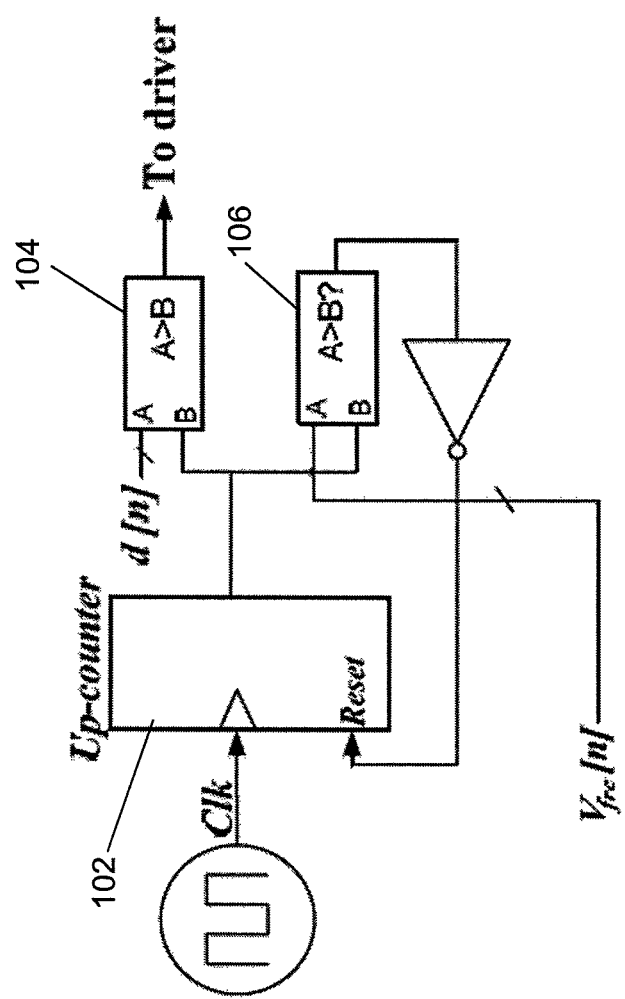
FIG. 3 is s block diagram of an implementation of digital pulse width modulation (DPWM) according to one embodiment.
Figure 4:
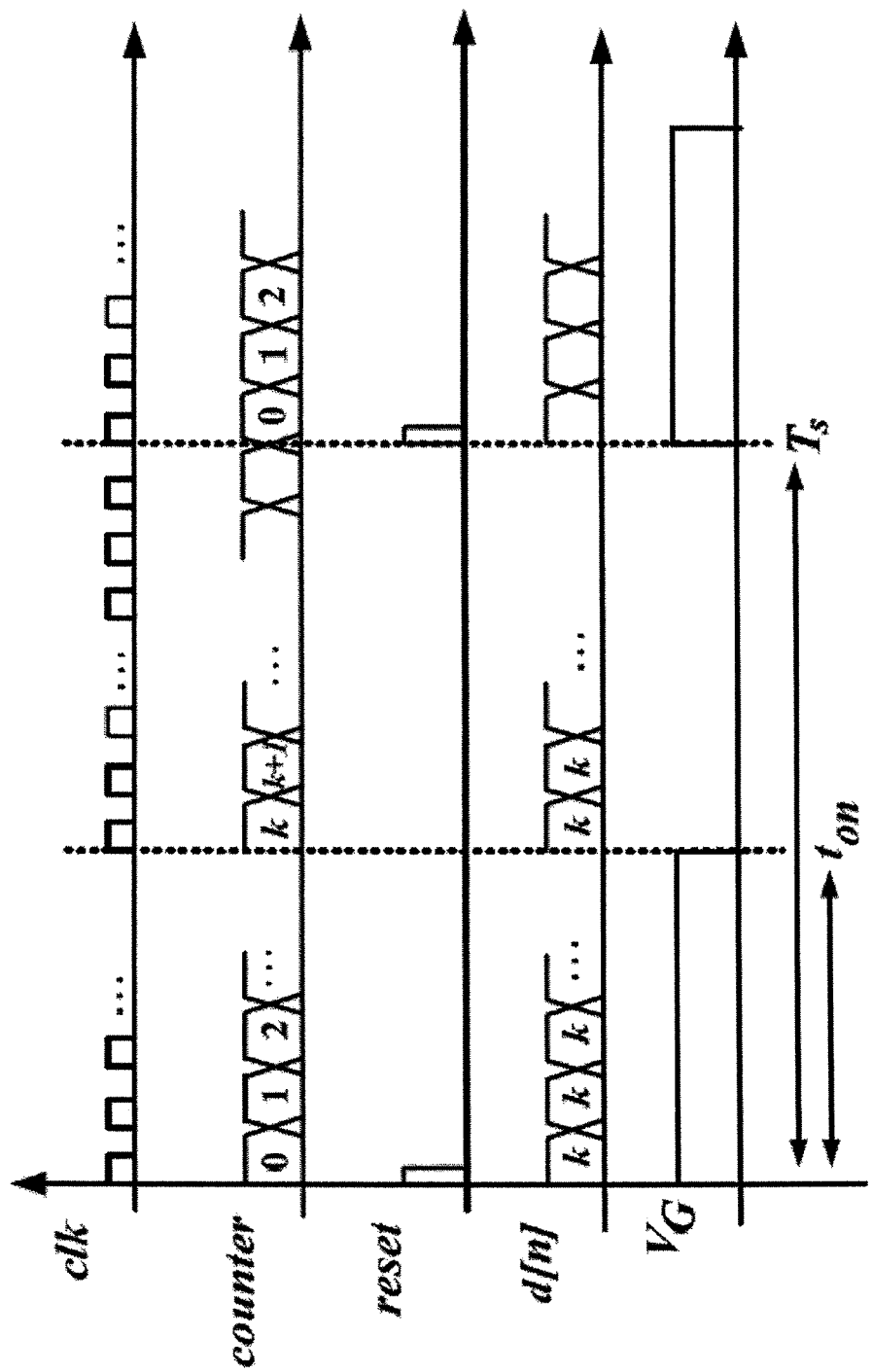
FIG. 4 shows key waveforms of the DPWM of FIG. 3.

An embodiment of the duty ratio controller is shown in FIG. 3, where a reset up-counter 102 with two comparators 104, 106 form the basic functional block for DPWM. In FIG. 3, Clk represents the clock signal of the digital control circuit, Vcon[n] is the digitalized control data, and Vfre[n] is a pre-defined discrete-time signal that determines the switching frequency. The counter resets to zero whenever the output of the counter reaches the value that is given by Vfre[n]. This allows the output signal of the counter to form a discrete time based saw-tooth waveform that is compared with d[n]. FIG. 4 shows key operating waveforms of the DPWM, where VG represents the gate driver signal and d[n] is the digitalized duty cycle data. The switching frequency provided from the DPWM is given by Equation 1.

$$f_s = \frac{Clk}{V_{fre}[n]} \quad (1)$$

A function of a digital controller as described herein is to allow the lamp power to dim at a faster rate so that the input PF can be increased by limiting the control range on a phase-cut dimmer. In this embodiment a logic counter is used to provide information about the average DC signal of the pulse generated at the output of a comparator. The DC signal provides information about the magnitude of the firing angle being applied to the dimmer. An embodiment of the feed-forward loop in the controller is shown in the logic flow chart of FIG. 5.

Figure 5:
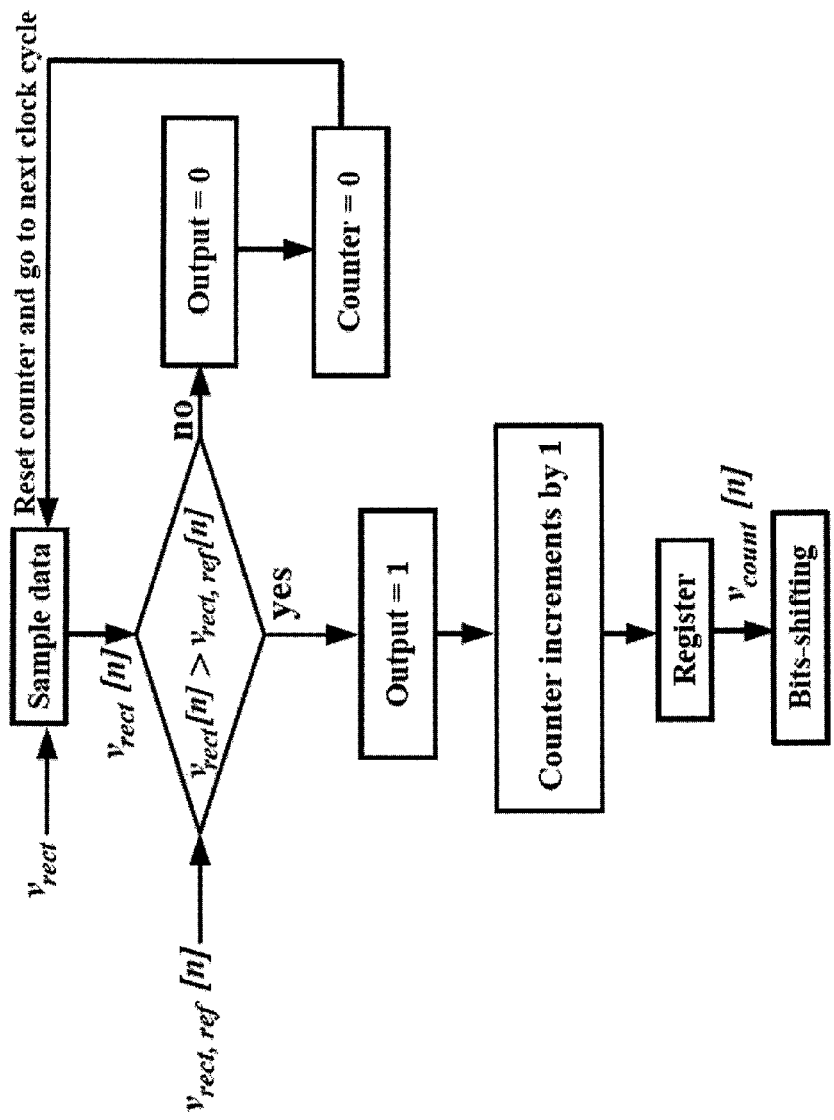
FIG. 5 is a logic flow diagram of a feed-forward loop of a digital controller according to one embodiment.

As shown in FIG. 5, the sampled rectified voltage signal (vrect[n]) is compared with a pre-defined reference signal (vrect,ref[n]). A digital counter is then used to determine the pulse-width of the pulse at the output of the digital comparator. If vrect[n] is higher than vrect,ref[n], then the counter will increment by one and the register will keep the updated value from the counter. Once the output of the comparator reaches zero, the counter will be reset to zero again. At this time, the register keeps the final value of the counter (vcount[n]) and passes this value to the bit-shifting block, where the gain multiplication is performed. The output signal of the bit-shifting block will then be subtracted from a pre-defined constant signal, where the final output signal will be processed to the digital compensator.

In the low power detection mode, the objective is to shut down the circuit power when the lamp is being dimmed below its stable operating region (i.e., beyond the negative impedance range). This is because as the lamp is forced to dim over its negative impedance range, the lamp current drops to several mA and an arc cannot be sustained across the electrodes, such that eventually only a small amount of light appears at the end of the tube. Although this situation only happens during the transition between the lamp lowest dimming point and its off-state, this situation can significantly shorten the lamp lifetime. As a result, by cutting off the lamp power when the dimmer is forced to dim the lamp beyond the lamp negative impedance region, the lamp lifetime can be extended even during dimming.

Figure 6:
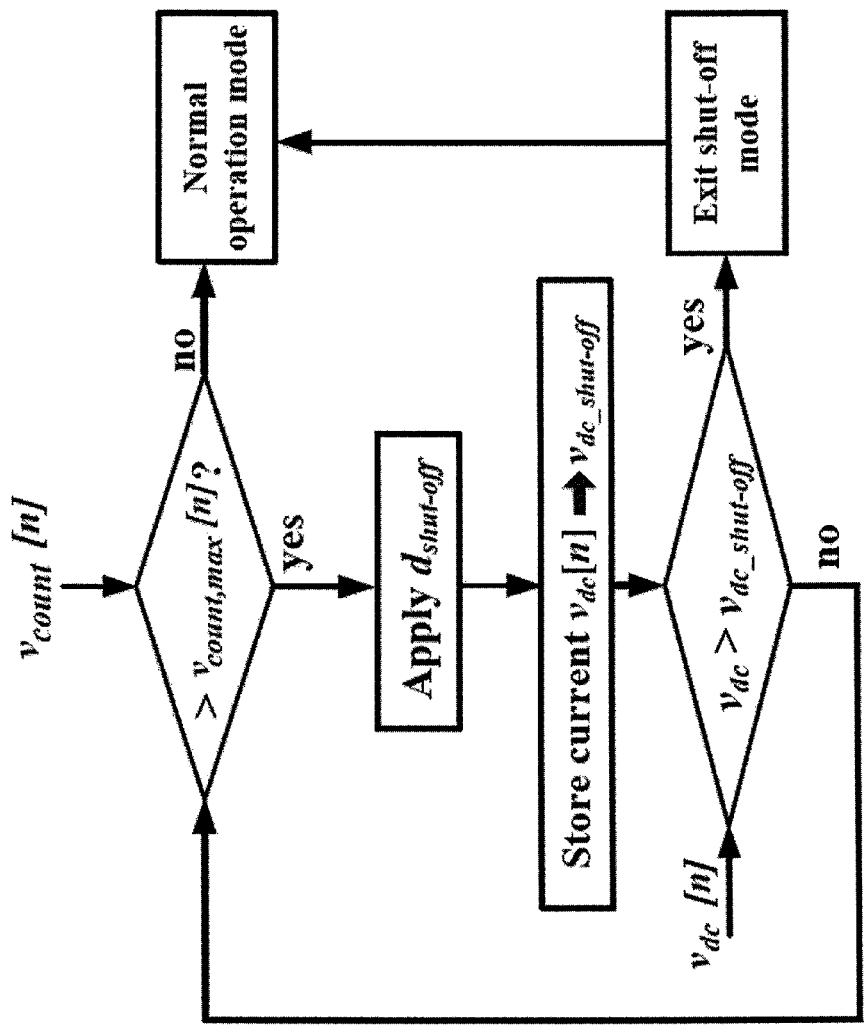
FIG. 6 is a logic flow diagram of a low power detection function according to one embodiment.
Figure 7:
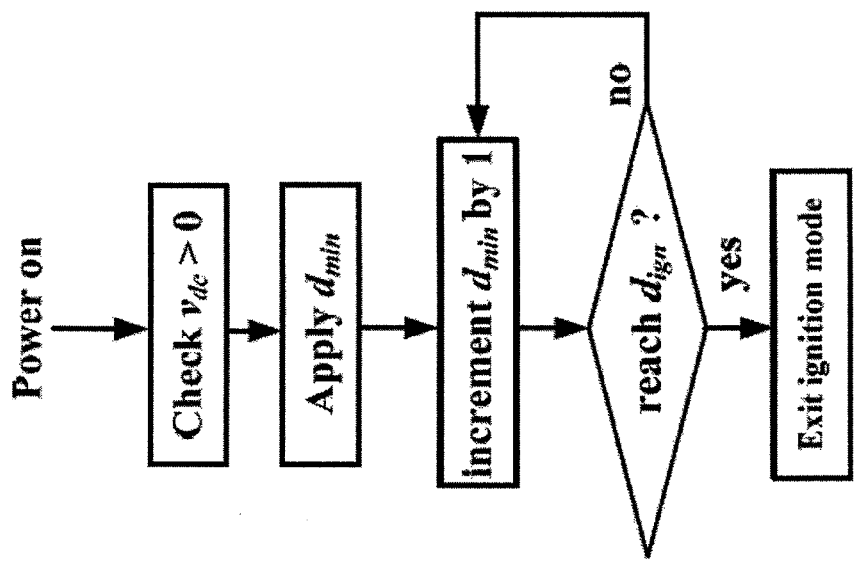
FIG. 7 is a logic flow chart for a soft-start function according to one embodiment.

An embodiment of a logic flow chart of this control mode is shown in FIG. 6. In this operating mode, both vrect and vdc are required to provide proper automatic power shut-off function. The first step in this mode is to compute the width of the discontinuous portion of vrect($\alpha$), in which this information can be provided by the feed-forward loop shown in FIG. 5. If this value is greater than vcount, max, then the shut-off power mode is entered and an extremely small duty ratio is applied to the MOSFET. The lamp is essentially off in this condition. Meanwhile, the corresponding digitalized DC-link voltage signal is also stored. This information is needed when the dimmer is switched to a higher control position, wherein at such time the lamp works in the normal operation mode. This transition is achieved by monitoring vdc[n] with the previously stored vdc[n] that corresponds to the lamp power shut-off condition. If the current vdc[n] is greater than the stored value, the system should exit this mode and enter the normal operation mode immediately.

To maximize the lamp dimming range, $\alpha$shut-off, which is the maximum allowable firing angle of the dimmer, should be chosen properly in the design. $\alpha$shut-off may be calculated according to Equation 2, where $\eta$ is the efficiency between the average power at the DC-link capacitor and the lamp output power.

$$P_{lamp\_shut-off}(\alpha_{shut-off}) = \frac{V_p}{\pi}(1 + \cos(\alpha_{shut-off}))\frac{d}{1-d(\alpha_{shut-off})}I_{dc}(\alpha_{shut-off})\eta \quad (2)$$

In contrast to the instant-start method used in analog control circuits, soft-start ignition is implemented in the digital controller by slowly increasing the duty ratio of the power switch. In this technique, a small voltage is initially applied across the lamp once the power is turned on. The voltage across the lamp then increases gradually as the duty ratio increases. Once the lamp is ignited, the controller enters normal operation mode, where the duty ratio is adjusted according to a selected dimming level. This function increases the life of the lamp.

Figure 8:
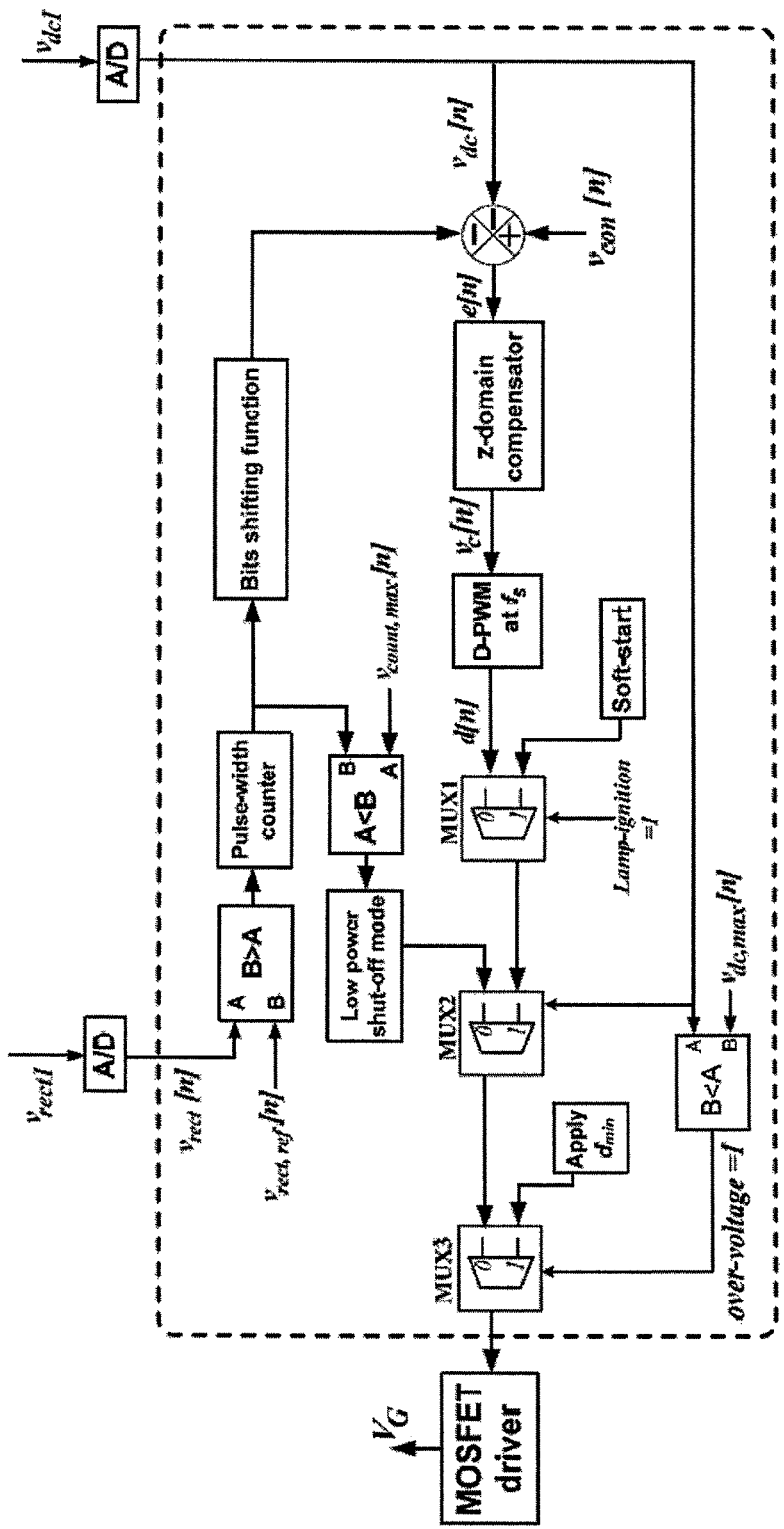
FIG. 8 is a block diagram of a digital controller for a single switch ballast according to one embodiment.

FIG. 8 shows a block diagram of a digital controller according to one embodiment. This embodiment includes the aforementioned functions of low power shut-off and soft-start. In general, the controller works as follows: when the power is on, the lamp ignition mode will be executed immediately. After the lamp is successfully ignited, the duty ratio decreases to its steady-state value and both vdc and vrect are then monitored continuously. A change in vrect means that the dimmer firing angle is being adjusted and a proper duty ratio will be provided to the power switch to control the lamp power and maintain high PF. Low power shut-off mode will be activated if the dimmer firing angle exceeds vcount, max [n]. DC-link over-voltage protection is also achieved by continuously monitoring the DC-link voltage with a pre-defined threshold value inside the controller so that when the DC-link voltage exceeds the threshold value, a proper signal is sent to the multiplexer (MUX3) and the controller shifts the ballast system to the over-voltage protection mode, where the duty ratio will be limited to a low value. In this way, the DC-link voltage is limited to a low value to protect the lamp under abnormal operating conditions.

Domain Analysis

Figure 9:
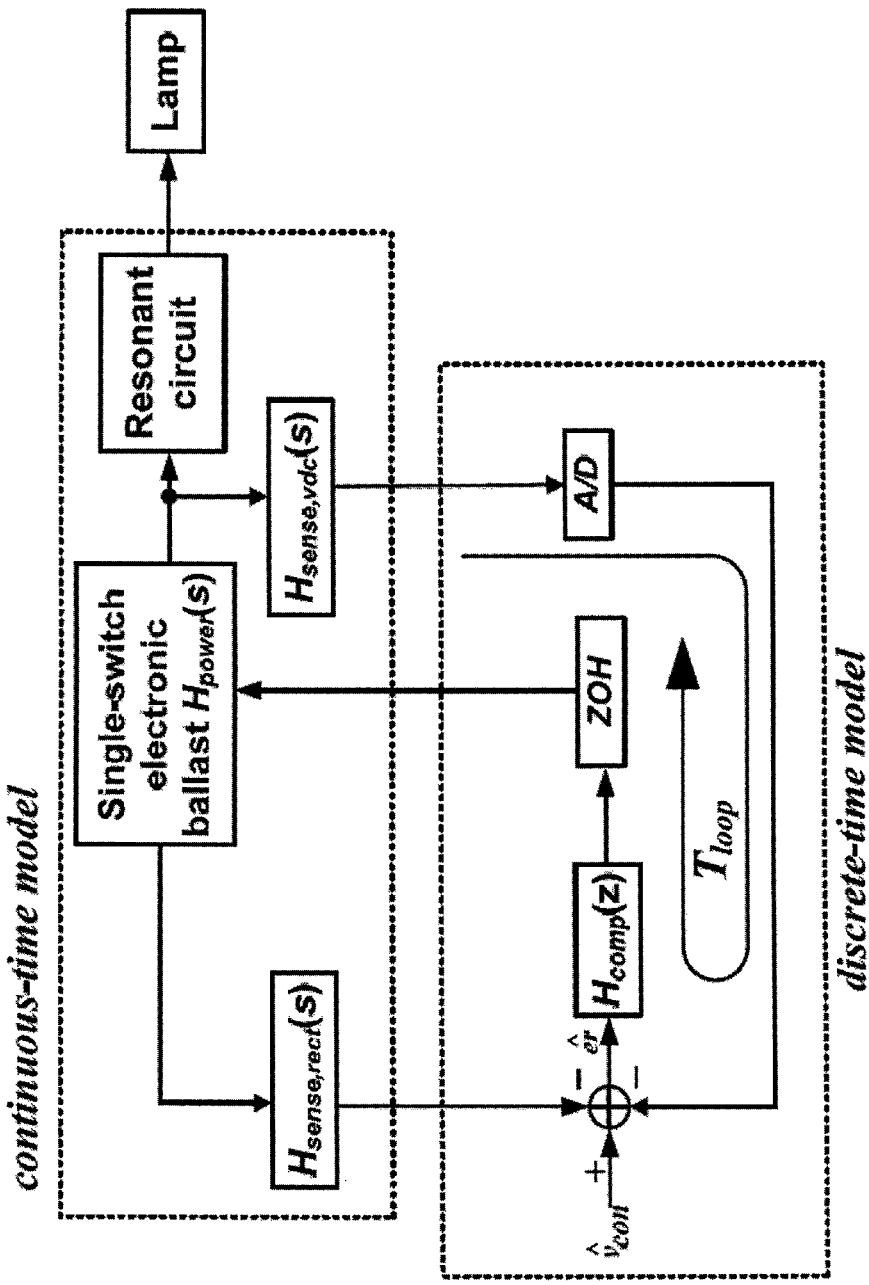
FIG. 9 shows an embodiment of an overall system model with continuous-time and discrete-time domains.

To design a proper digital compensator in the discrete-time controller, a model of the complete ballast system was first developed as shown in FIG. 9, where the continuous-time model (sdomain) of the power circuit was combined with the discrete-time model (z-domain) of the controller. A direct digital design approach was used as it allows the entire system to be analyzed in the z-domain. Conventional linear control theory used in the s-domain analysis can then be applied to the z-domain system, where the compensator can be designed based on the overall open-loop behaviour. In direct digital design, the continuous-time model of the plant was converted into a discrete time model and then the closed-loop analysis was performed in the z-domain environment. Equation 3 shows the relationship between the continuous-time model of the plant and its discrete-time model, where $Z\{H(s)/s\}$ represents the z-transform of $H(s)/s$ and $H(s)$ is the continuous-time model of the plant.

$$H(z) = (1 - z^{-1})Z\left(\frac{H(s)}{s}\right) \quad (3)$$

Figure 10:
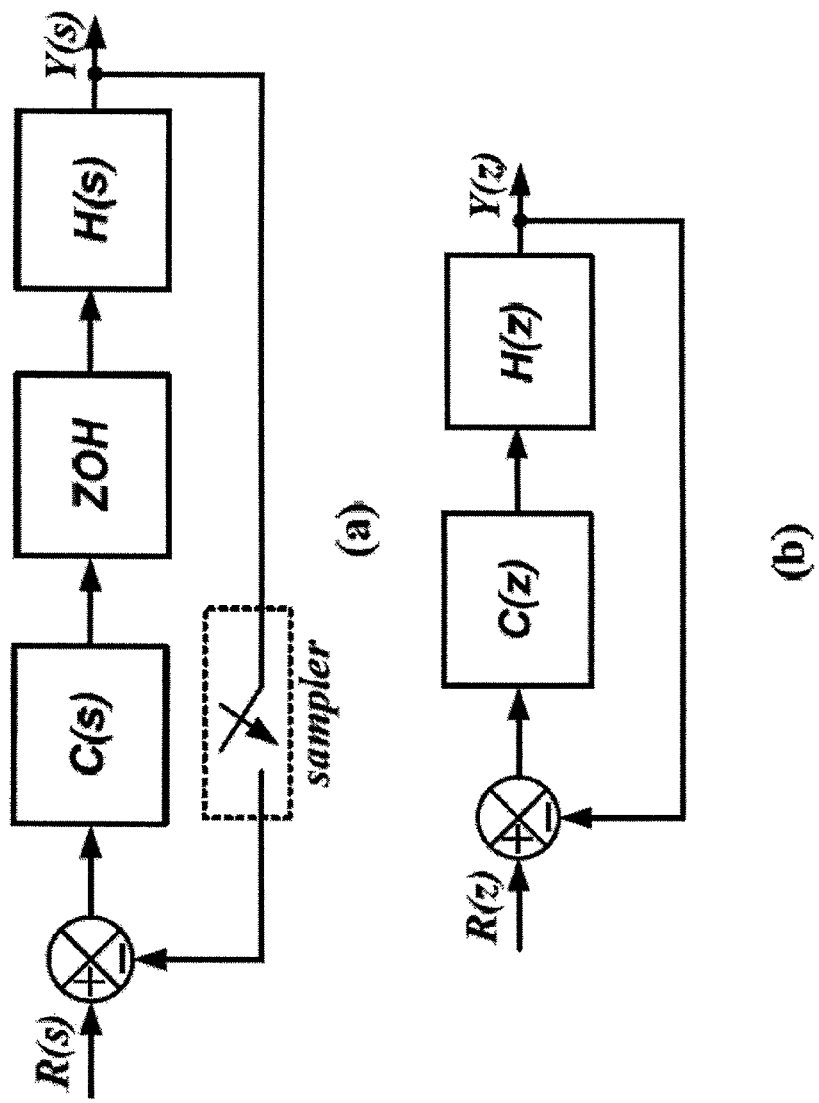
FIGS. 10(a) and 10(b) show block diagrams of a mixed control system and a pure discrete equivalent system, respectively.

The conversion in Equation 3 is illustrated by FIGS. 10(a) and 10(b), where C(s) is the controller; H(s) is the controlled plant; Y(s) is the output signal in continuous-time and R(s) is the reference signal in continuous-time.

As shown in FIG. 10(b), the sampler (i.e., analog to digital converter, ADC) and the zero-order hold (ZOH) block are simplified and are represented by $(1-z^{-1})$ and $1/s$ in Equation 3. The presence of the step response term $1/s$ means that the control signal that comes from the ZOH block during each sampling period is a step signal.

From FIG. 9, the loop transfer function that consists of both s-domain and z-domain models may be represented by Equation 4, where Hcomp(z) is the discrete-time model of the compensator and HZOH(s) is the s-domain ZOH transfer function that accounts for the DAC function or the PWM model. The transfer function of HZOH(s) is given in Equation 5, where Tsp is the sampling period.

$$T_{loop} = H_{power}(s)H_{sense,vdc}(s)K_{ADC}H_{comp}(z)H_{ZOH}(s) \quad (4)$$

$$H_{ZOH}(s) = \frac{1 - z^{-1}}{sT_{sp}} \quad (5)$$

As can be observed from Equation 4, with the exception of Hcomp(z), the rest of the models are represented by their s-domain transfer functions. Hence, before going into the design considerations for the compensator, the overall open-loop transfer function that is represented in z-domain is studied, which is given by Equation 6 using Equation 3, where Hpower(s) is given by Equation 6.1; Hsense,vdc(s) is a simple resistive scale-down network represented by G and Gd($\alpha$) is given by Equation 6.2.

$$H_{open-loop}(z) = (1 - z^{-1})Z\left(\frac{H_{power}(s)H_{sense,vdc}(s)}{s}\right) \quad (6)$$

$$= (1 - z^{-1})Z\left(\frac{GG_d(\alpha)r_{L,ac}(s)}{s(sC_2r_{L,ac}(s) + 1)}\right)$$

$$\frac{\hat{v}_{dc}(s)}{\hat{d}(s)} = \frac{G_d(\alpha)r_{L,ac}(s)}{sC_2r_{L,ac}(s) + 1} \quad (6.1)$$

$$G_d(\alpha) = \frac{V_{rect}^2(\alpha)d(\alpha)T_s}{2V_{dc}(\alpha)L_{eq}} \quad (6.2)$$

Since fc is very small in this design, all the high frequency poles and zeros introduced by rL,ac(s) do not have any significant effects on the system response and the phase margin of the system. This allows further simplification to be done in Equation 6. One way to simply Equation 6 is to consider rL,ac(s) as a mean resistance at each dimming level. Equation 6.3 describes this relationship and is expressed as a function of $\alpha$. The corresponding z-domain overall open-loop transfer function is given in Equation 7.

$$R_{inv}(\alpha) = \frac{V_{dc}(\alpha)}{I_{dc}(\alpha)} \quad (6.3)$$

$$H_{open-loop}(z) = (1 - z^{-1})\left(\frac{1.153e - 8z^{-1} + 1.153e - 8z^{-2}}{1 - 2z^{-1} + 0.9996z^{-2}}\right) \quad (7)$$

Figure 11:
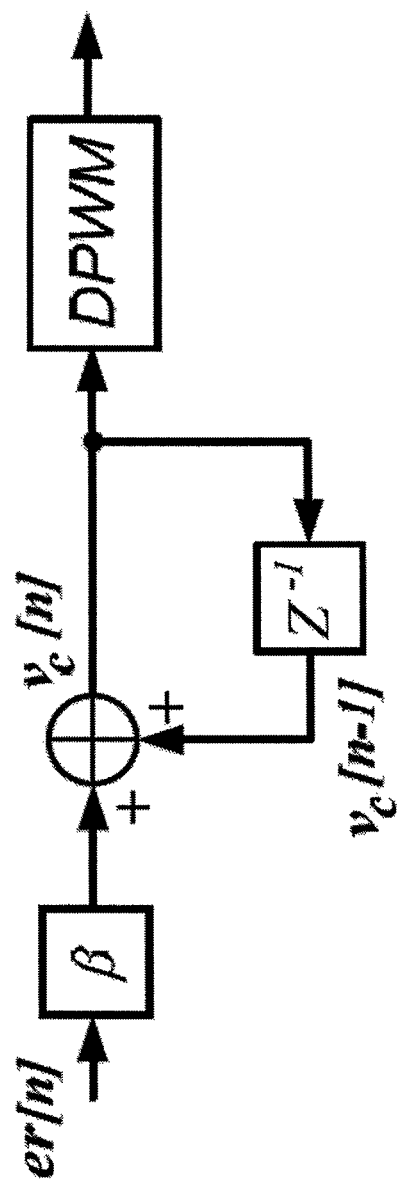
FIG. 11 is a block diagram of an implementation of a discrete-time integrator according to one embodiment.

From a Bode plot of Equation 7 it can be observed that due to the presence of Gd($\alpha$), the low frequency gain during dimming is much lower than at full power. Hence, to achieve infinite high DC gain to eliminate any steady-state error, a single-pole compensator that introduces very high DC gain may be used in the z-domain design. According to the s-to-z domain transform given in Equation 8, the discrete-time model of the integrator is then given by Equation 9, where vc(z) is the z-domain of the input control signal to DPWM and er(z) is the z-domain of the error signal. Equation 9 is the Euler integrator representation. To implement the Euler integrator in the digital controller, Equation 9 must first be converted into a time domain equation so that it can be realized using digital (e.g., VHDL) codes in the digital controller. The discrete time domain of Equation 9 is given by Equation 4-10 using inverse z-transform, where n represents the nth sampling time. A block diagram of Equation 10 is shown given in FIG. 11.

$$z^{-1} = e^{-sT_{sp}} = e^{-j2\pi f T_{sp}} \quad (8)$$

$$G_{comp}(z) = \frac{v_c(z)}{er(z)} = \frac{\beta}{1-z^{-1}} \quad (9)$$

$$v_c[n] = v_c[n-1] + \beta er[n] \quad (10)$$

The overall loop z-domain transfer function is given in Equation 11. fc may be obtained by first converting Equation 11 into its s-domain function and equating |Hloop(s)|=1. Calculation of fc is then given by Equation 12.

$$H_{loop}(z) = \frac{1.229e - 7z^{-1} + 1.229e - 7z^{-2}}{1 - 2z^{-1} + 0.9996z^{-2}} \quad (11)$$

$$f_c = \frac{1}{2\pi}\left(\frac{\sqrt{1 + 4C_2^2 R_{inv}^4(\alpha) G_d^2(\alpha)} - 1}{2C_2 R_{inv}(\alpha)}\right)^{1/2} \quad (12)$$

Embodiments of the invention are further described by way of the following non-limiting example.

Working Example

An exemplary digital controller was designed according to the specifications listed in Table 1.

TABLE 1

Specifications of the Digital Controller

| Line voltage: | 90~120 $V_{rms}$, 60 Hz |
|---|---|
| Tested Lamp: | 13 W 4-pins Dulux D/E 3500K from Osram Sylvania |
| Commercial CFL: | 13 W, 175 mA 3500K from Osram Sylvania (CF13EL) |
| A/D conversion data (bits): | 10 bits |
| Clock frequency: | 10 MHz |
| Switching frequency: | 70 kHz |

Simulation Results

Figure 12:
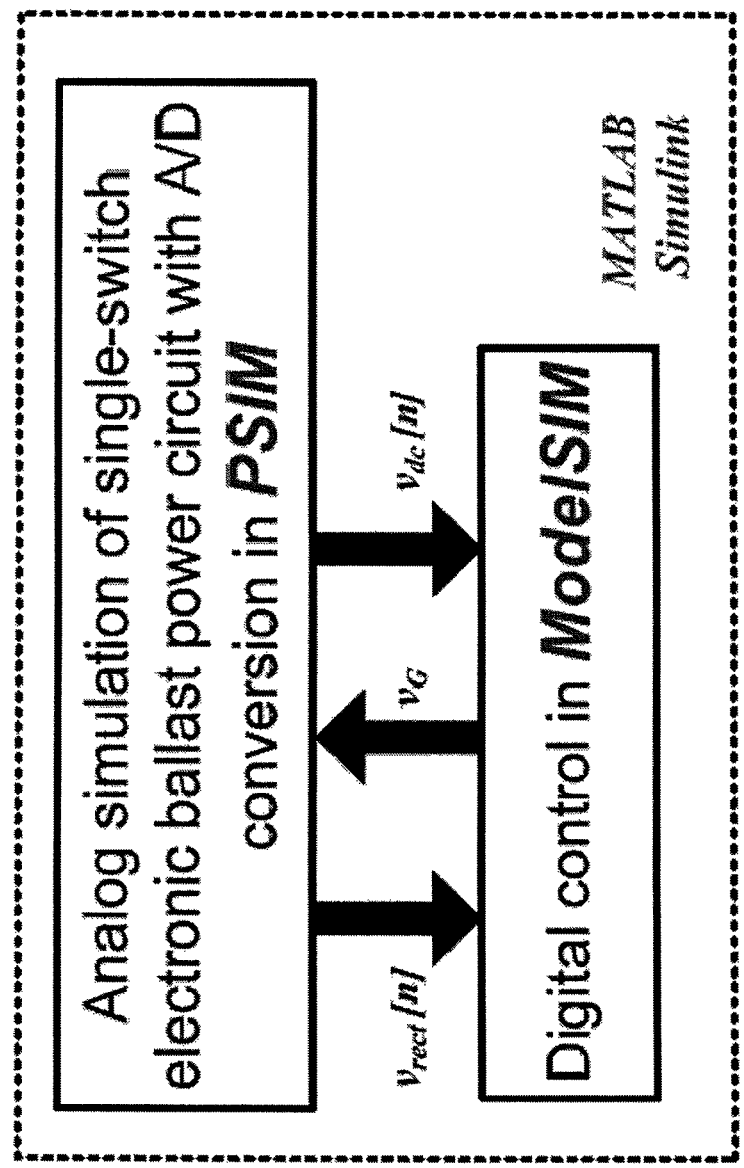
FIG. 12 is a block diagram of a power circuit simulation with digital control in Simulink.

To obtain simulation results from the completed simulated system, the software implementation in ModelSIM® 6.3 (Mentor Graphics, Wilsonville, Oreg., U.S.A.) was combined with an analog power circuit in PSIM® (Powersim Inc., Woburn, Mass., U.S.A.) and the entire system was then simulated in Simulink® (The MathWorks, Inc., Natick, Mass., U.S.A.). FIG. 12 shows the interactions between the simulation software. To achieve a switching frequency of 70 kHz, the digital counter in the DPWM was reset to zero once 144 clock cycles were counted. The two input signals (vdc and vrect) to the digital control block were both 10-bit data. In PSIM, analog-to-digital (A/D) conversion of vdc and vrect was performed by using discrete control blocks that implement the same function as an ADS 7884 A/D conversion chip does, where the A/D conversion is performed by sampling the complete 10-bit data every 16 clock cycles.

As for the digital compensator, the z-domain of Equation 13 was obtained through the continuous-to-discrete-time transform in MATLAB as shown in Equation 14, where the sampling frequency is equal to the clock frequency, which was 10 MHz. The corresponding gain was then determined to be 0.000083.

$$G_{comp}(s) = \frac{k_i}{s} \quad (13)$$

$$G_{comp}(z) = \frac{4.167e - 006}{1 - z^{-1}} \quad (14)$$

Figure 13:
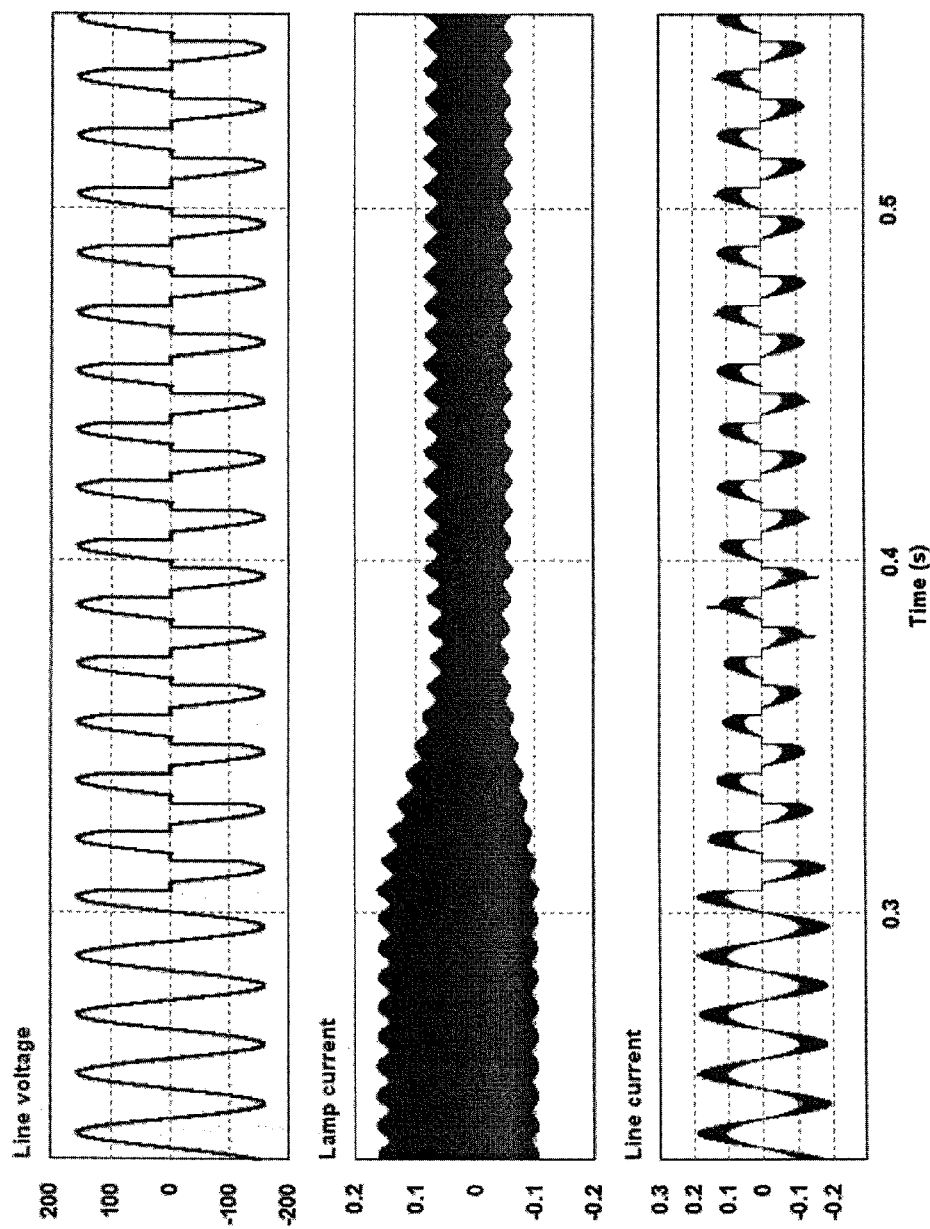
FIG. 13 is a plot showing voltage and current waveforms during a dimming transition obtained from a simulation.

As verification of the functionality of the digital compensator, FIG. 13 shows the simulated lamp current when there is a step change in the dimmer firing angle. A stable lamp current can be observed. Due to the relatively slow response of the system, the lamp current takes a few line cycles to return to the next steady-state operation. In this design, fc was determined to be 3.4 Hz and the phase margin achieved was 48.2° at full power and 69° during dimming.

Experimental Results

A digital signal processing (DSP) board (Altera Stratix Edition II EP2S60F1020C4) was used to prepare an experimental prototype. The design specifications of the ballast power circuit are given in Table 2.

TABLE 2

Design Specifications of Experimental Circuit

| Line voltage: | 90~120 $V_{rms}$, 60 Hz |
|---|---|
| Dimmer Type: | 300 W SKYLARK Dimmer from Lutron, SELVB-300P |
| Lamp: | 13 W 4-pins Dulux D/E 3500K from Osram Sylvania |
| Commercial product: | 14 W Dimmable CFL from Osram Sylvania, CF14EL/TWIST/DIM |

Figure 14A:
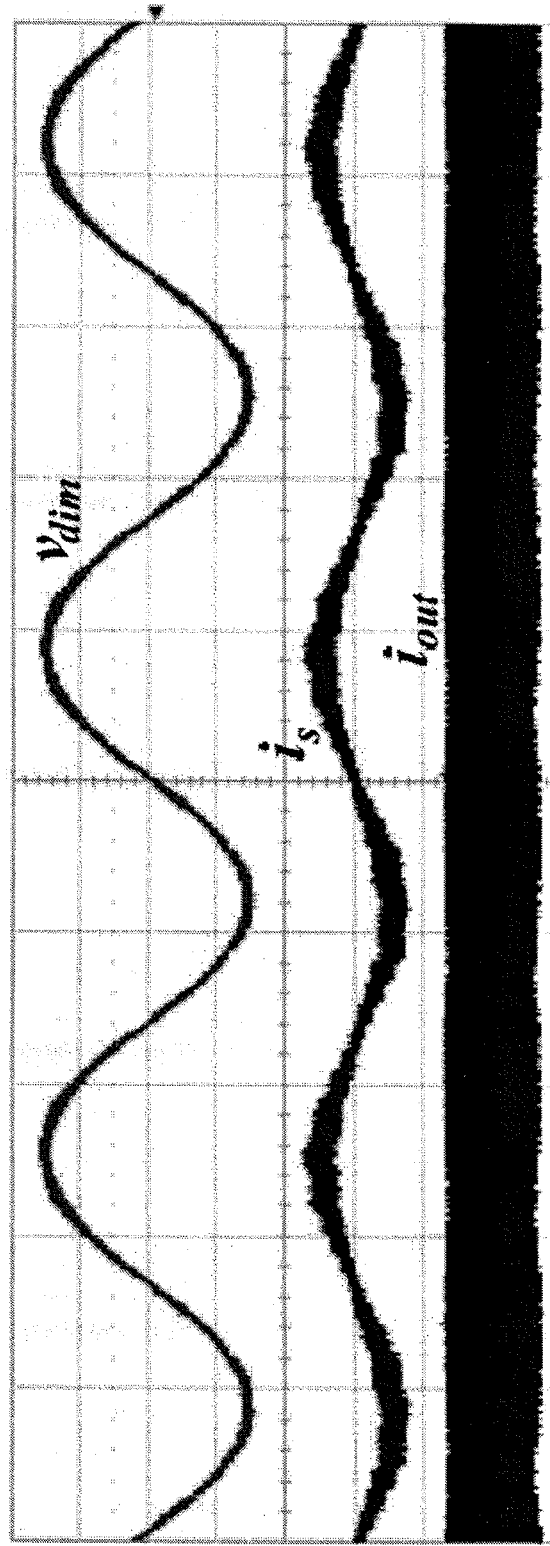
FIGS. 14(a) and 14(b) are plots of line current performance of a ballast circuit with digital control according to one embodiment.
Figure 14B:
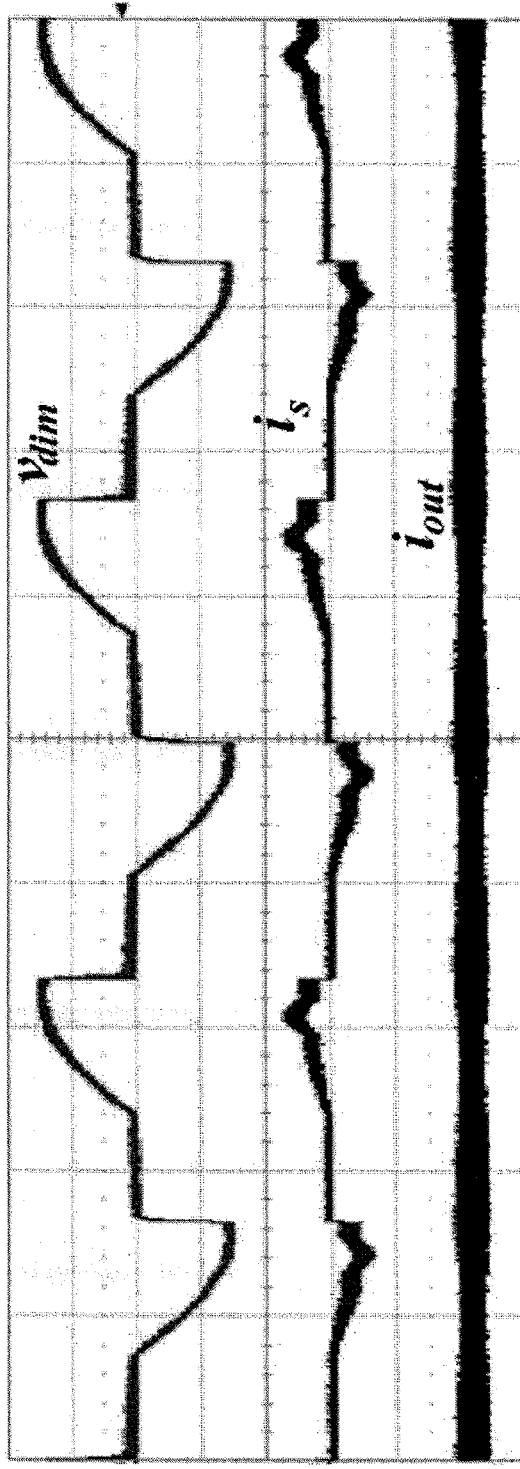
Figure 15:
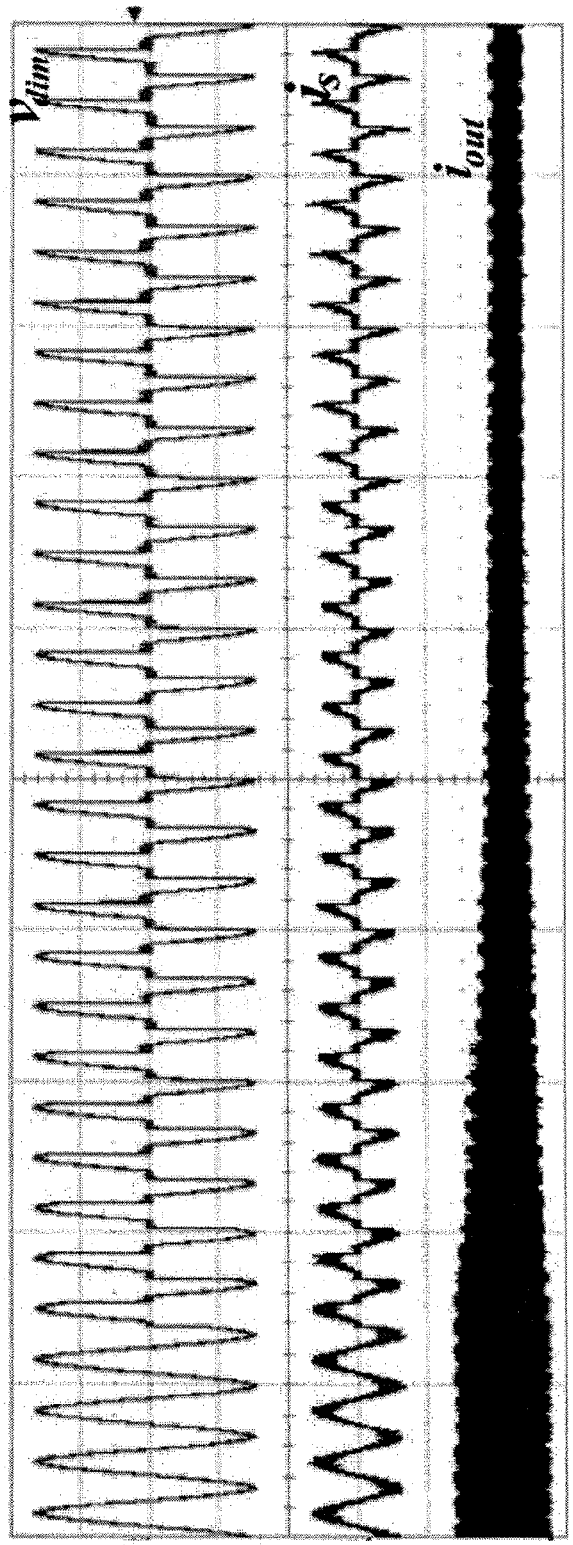
FIG. 15 is a plot of lamp current during dimming of a ballast circuit with digital control according to one embodiment.

FIGS. 14(a) and 14(b) show the steady-state line current and lamp current waveforms at full power and during dimming. The PF measured in FIG. 14(b) is 0.76. The lamp current during the dimming transition is shown in FIG. 15. It is observed that as the firing angle of the line voltage increases during dimming, the lamp current maintains very stable operation.

Figure 16:
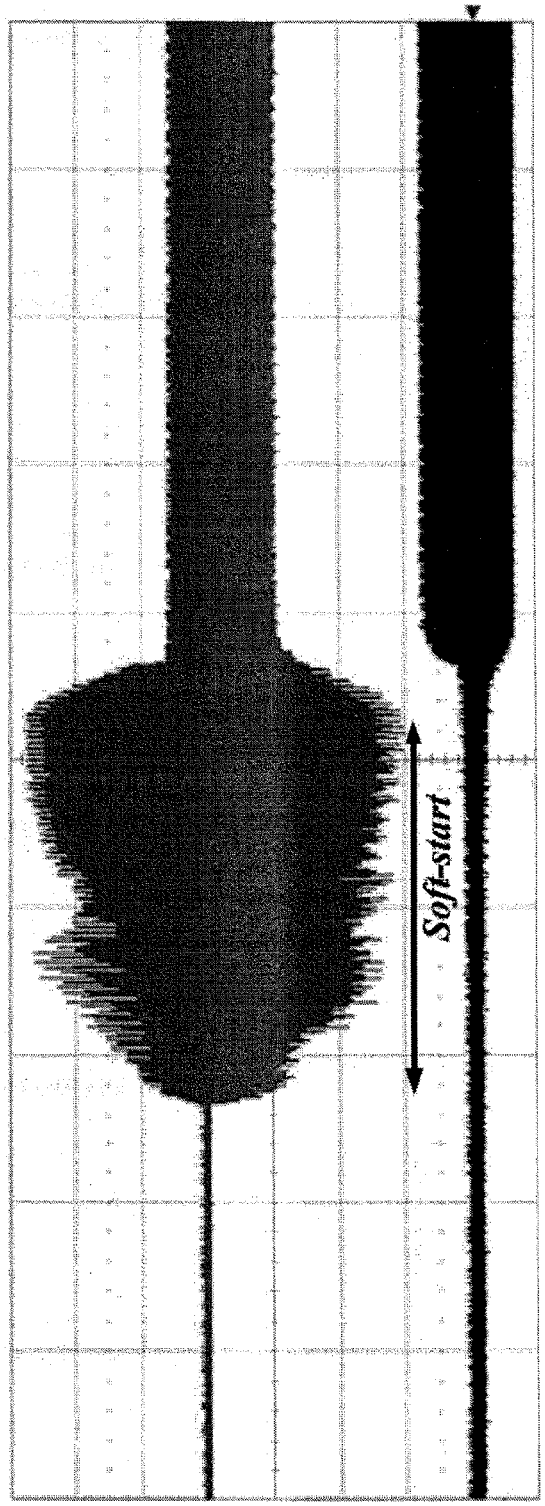
FIG. 16 is a plot showing ignition of a lamp at full power with soft-start feature using a digital controller as described herein.
Figure 17:
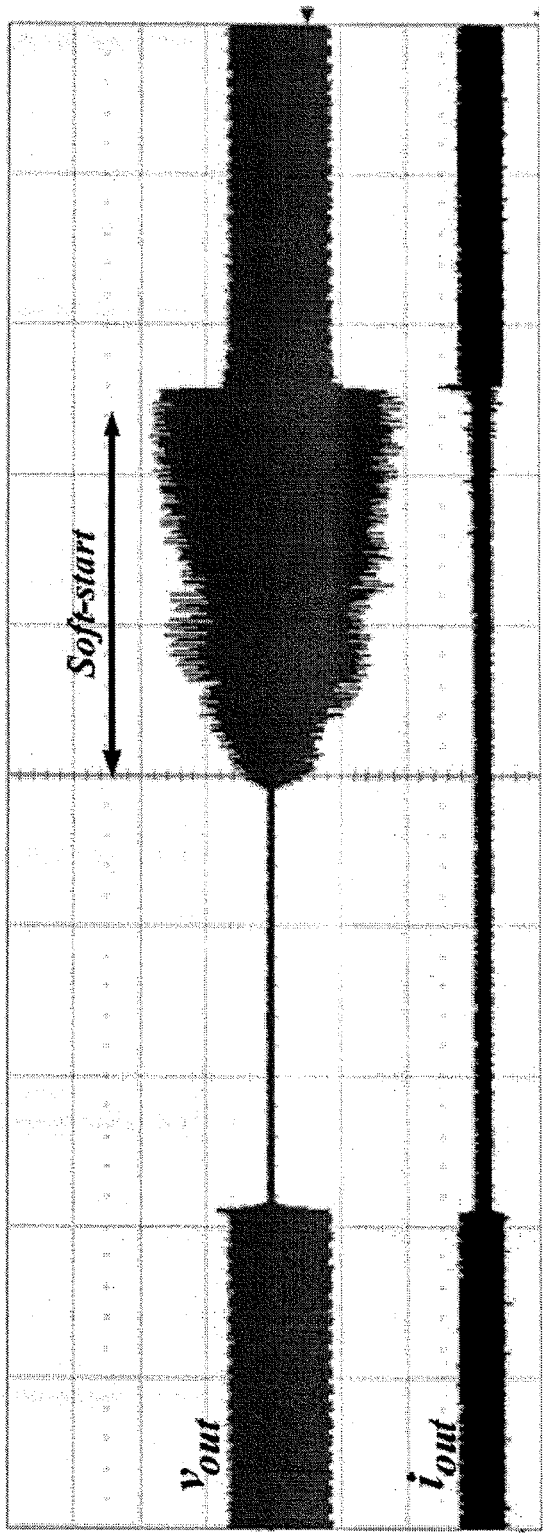
FIG. 17 is a plot showing ignition during dimming with soft-start feature using a digital controller as described herein.

FIGS. 16 and 17 show the lamp voltage and current during lamp ignition. FIG. 16 shows the case when the dimmer is at its full conduction angle and the FIG. 17 shows the case when the lamp is ignited at a low dimming level. In FIG. 17, the lamp is first turned off for 1.5 seconds and then turned back on again. In both figures, the lamp voltage increases gradually until the point where the lamp current starts to increase to its steady state level. As a result, lamp soft-start ignition is achieved throughout the whole dimming range.

Figure 18A:
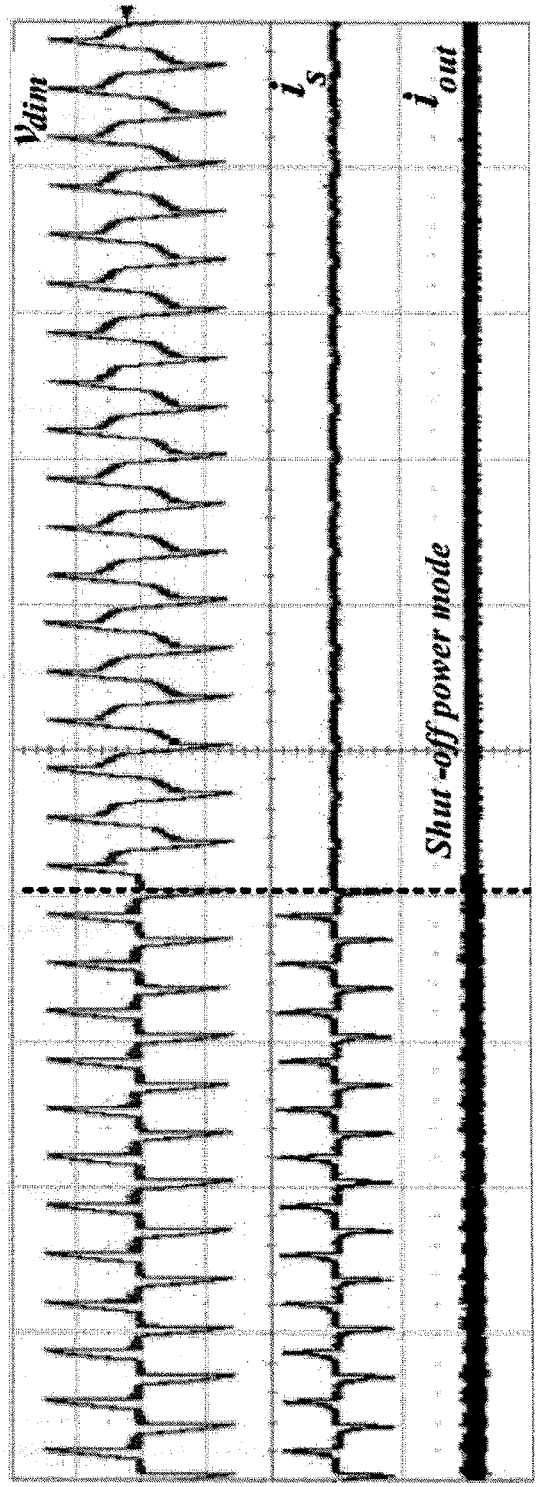
FIGS. 18(*a*) and 18(*b*) are plots showing low power shut-off mode using a digital controller as described herein.
Figure 18B:
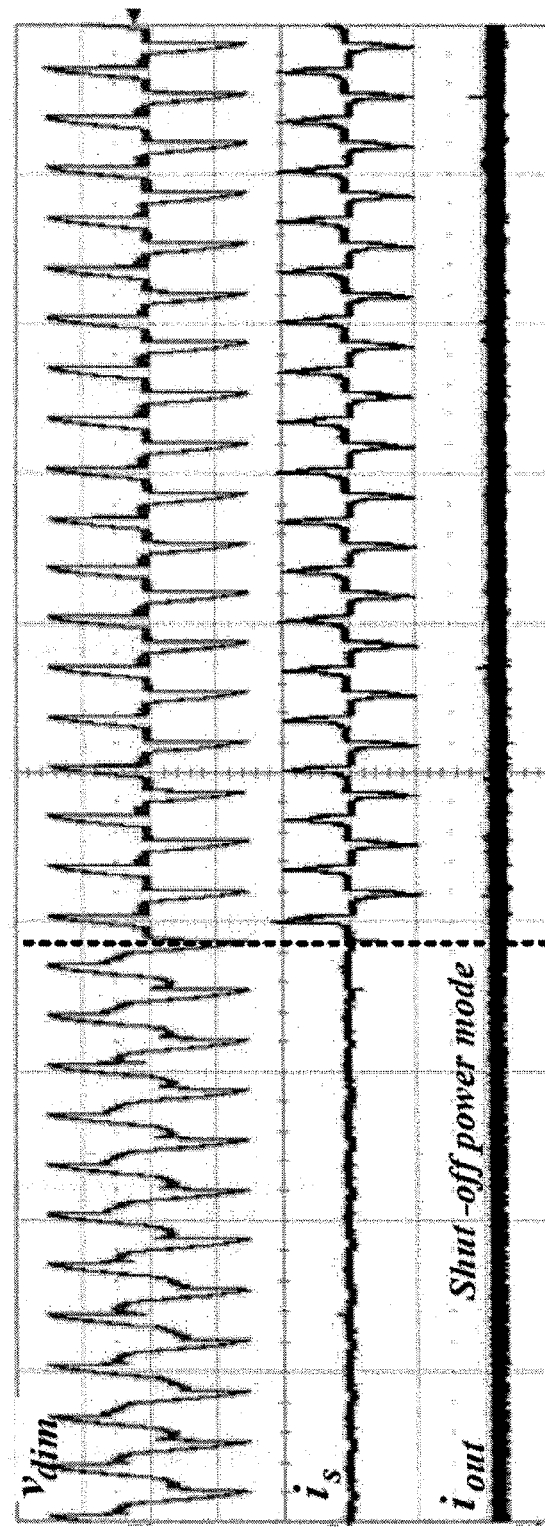

The low power shut-off mode feature of the digital controller is verified by FIGS. 18(a) and 18(b), which show the voltage after the dimmer (vdim), the line current, and the lamp current. It is observed in FIG. 18(a) that as the dimmer firing angle increases, the lamp current decreases gradually until the point where the discontinuous portion of the line voltage exceeds the predefined value in the digital controller, then both the line current and lamp current go to zero. The reverse operation mode (i.e., from low power shut-off mode to low dimming) is shown in FIG. 18(b). Hence, the results justify the logic of the digital controller, where the lamp power is automatically cut off by reducing the duty ratio to a small value when the dimmer switch is set at a very low control range.

Figure 19:
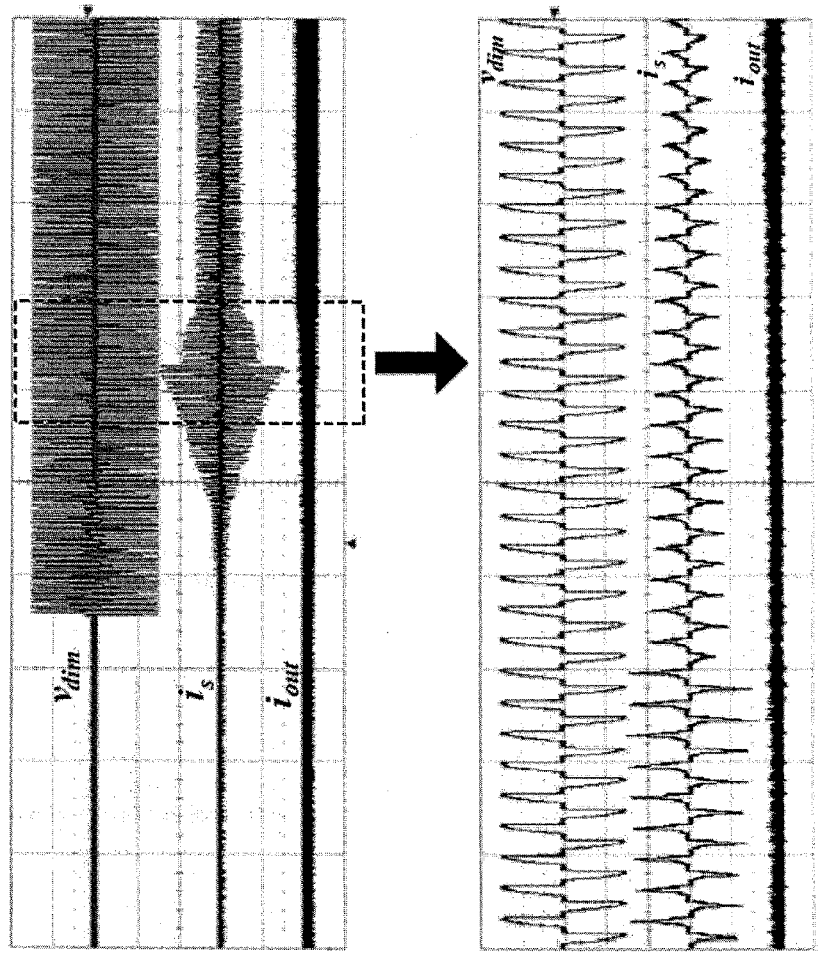
FIG. 19 is a plot showing input current and voltage waveforms at low dimming start-up using a digital controller as described herein.

FIG. 19 shows the starting transients of vdim and is when the dimmer is turned on at a low dimming level. Different from FIGS. 18(a) and 18(b), vdim in FIG. 19 increases from zero at the moment when the dimmer is switched on. In conclusion. 18(a), 18(b), and 19 demonstrate that regardless of the status of the dimmer on/off switch, a digital controller as described herein allows the lamp to enter the shut-off power mode before the lamp enters its positive impedance operating region, where unstable lamp operation occurs.

Figure 20:
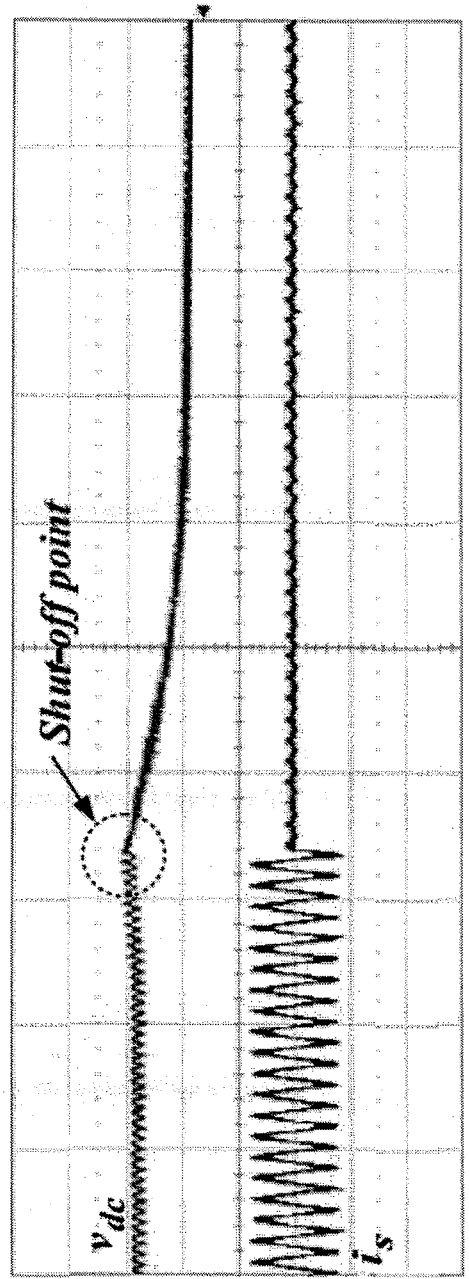
FIG. 20 is a plot showing line current and DC-link voltage in over-voltage protection mode.

FIG. 20 shows vdc and is in the over-voltage protection mode. In this example, the maximum value of vdc was internally set to 100 V. Hence, when vdc increases over 100 V, the ballast system will shift to over-voltage protection mode and as observed from FIG. 20, the line current drops to zero immediately when DC-link over-voltage is detected.

It will be appreciated that the above examples may be carried out in whole or in part, and the examples or parts thereof may be combined.

The contents of all cited patents, patent applications, and publications are incorporated herein by reference in their entirety.

While the invention has been described with respect to illustrative embodiments thereof, it will be understood that various changes may be made to the embodiments without departing from the scope of the invention. The described embodiments are to be considered merely exemplary and the invention is not to be limited thereby.

REFERENCES

[1] Jingpeng Zhu; Fang Zhuo; Zhao'an Wang; "Design of a digital controller for high frequency HID lamp ballast" in Proceedings of the 2009 IEEE International Power Electronics and Motion Control Conference, 2009. IPEMC '09, pp. 2516-2520.

[2] Duk Jin Oh; Hee Jun Kim; Kyu Min Cho; "A digital controlled electronic ballast using high frequency modulation method for the metal halide lamp" in Proceedings of the 2002 Power Electronics Specialists Conference, 2002. pesc 02. pp. 181-186.

[3] Azcondo, F. J.; Diaz, F. J.; Casanueva, R.; Branas, C.; Zane, R.; "Low-frequency-square wave electronic ballast with resonant ignition using digital mode and power control" in *Proceedings of the 2006 IEEE Applied Power Electronics Conference and Exposition,* 2006. APEC '06.

[4] Ishizuka, Y.; Asako, Y.; Ueno, M.; Matsuo, H.; "A design of a low-delay DPWM control circuit for DC-DC converter" in Proceedings of the IEEE 2007 International Telecommunications Energy Conference, 2007. INTELEC 2007, pp. 342-347.

[5] Dancy, A. P.; Chandrakasan, A. P.; "Ultra low power control circuits for PWM converters" in Proceedings of the IEEE 1997 Power Electronics Specialists Conference, PESC '97, pp. 21-27.

[6] Jinwen Xiao; Peterchev, A. V.; Sanders, S. R.; "Architecture and IC implementation of a digital VRM controller" in Proceedings of the IEEE 2001 Power Electronics Specialists Conference, PESC 2001, pp. 38-47.

[7] Qiu, Yang; Li, Jian; Xu, Ming; Ha, Dong S.; Lee, Fred C.; "Proposed DPWM scheme with improved resolution for switching power converters" in Proceedings of the IEEE 2007 Applied Power Electronics Conference, APEC 2007, pp. 1588-1593.

The invention claimed is:

1. A digital controller for an electronic ballast for a fluorescent lamp comprising:
   a feed-forward loop that provides information about a voltage firing angle, wherein the feed-forward loop includes a gain circuit and an analog-to-digital converter;
   a pulse width modulator that controls a duty ratio of at least one power switch of the electronic ballast according to the information,
   wherein the digital controller provides low power shut-off and soft-start ignition;
   wherein the digital controller is a single digital chip; and wherein the controller maintains a lamp current stability as the voltage firing angle of a line voltage increases as the lamp is dimmed.

2. The digital controller of claim 1, including a duty ratio controller implemented in the pulse width modulator.

3. The digital controller of claim 1, wherein the controller provides at least one of dimmability of the lamp, detection of lamp low power level, and DC-link capacitor over-voltage protection.

4. The digital controller of claim 1, where in the controller provides soft-start lamp ignition.

5. The digital controller of claim 1, wherein the controller provides detection of lamp low power level.

6. The digital controller of claim 1, wherein the controller provides DC-link capacitor over-voltage protection.

7. The digital controller of claim 1, wherein the electronic ballast is a single stage, single switch ballast.

8. The digital controller of claim 1, wherein;
   dimming of the lamp is controlled by varying phase of the firing angle; or
   dimming of the lamp is controlled by varying duty cycle of a control signal.

9. An electronic ballast for a fluorescent lamp, comprising the digital controller of claim 1.

10. The electronic ballast of claim 9, wherein the ballast is a single stage, single switch ballast.

11. A method of digitally controlling an electronic ballast for a fluorescent lamp, comprising:
    using a feed-forward loop that provides information about a voltage firing angle, wherein the feed-forward loop includes a gain circuit and an analog-to-digital converter;
    using a pulse width modulator that controls a duty ratio of at least one power switch of the electronic ballast according to the information, wherein the digital controller provides low power shut-off and soft-start ignition; and wherein the digital controller is a single digital chip; and wherein the controller maintains a lamp current stability as the voltage firing angle of a line voltage increases as the lamp is dimmed.

12. The method of claim 11, further comprising providing at least one of dimmability of the lamp, soft-start lamp ignition, detection of lamp low power level, and DC-link capacitor over-voltage protection.

13. The method of claim 11, further comprising providing soft-start lamp ignition.

14. The method of claim 11, further comprising providing detection of lamp low power level.

15. The method of claim 11, further comprising providing DC-link capacitor over-voltage protection.

16. The method of claim 11, wherein the ballast is a single stage, single switch ballast.

* * * * *